(12) United States Patent
Pado

(10) Patent No.: US 10,816,436 B2
(45) Date of Patent: Oct. 27, 2020

(54) SYSTEM FOR TEMPERATURE INSENSITIVE DAMAGE DETECTION

(71) Applicant: The Boeing Company, Chicago, IL (US)

(72) Inventor: Lawrence E. Pado, Berkeley, MO (US)

(73) Assignee: THE BOEING COMPANY, Chicago, IL (US)

(*) Notice: Subject to any disclaimer, the term of this patent is extended or adjusted under 35 U.S.C. 154(b) by 213 days.

(21) Appl. No.: 16/028,962

(22) Filed: Jul. 6, 2018

(65) Prior Publication Data

US 2020/0011761 A1 Jan. 9, 2020

(51) Int. Cl.
*G01M 5/00* (2006.01)

(52) U.S. Cl.
CPC ........ *G01M 5/0033* (2013.01); *G01M 5/0016* (2013.01)

(58) Field of Classification Search
CPC ............ G01M 5/0033; G01M 5/0016; G01M 5/0066; G01M 7/025; G06F 30/20; G06N 7/005; G01N 29/04; G01N 29/22; G01N 29/4436; G01N 2291/0289; G01N 2291/106; G01N 2291/2694
See application file for complete search history.

(56) References Cited

U.S. PATENT DOCUMENTS

| | | | |
|---|---|---|---|
| 5,195,046 A | 3/1993 | Gerardi et al. | |
| 5,774,376 A | 6/1998 | Manning | |
| 6,006,163 A | 12/1999 | Lichtenwalner et al. | |
| 6,996,480 B2 | 2/2006 | Giurgiutiu et al. | |
| 7,024,315 B2 | 4/2006 | Giurgiutiu | |

(Continued)

FOREIGN PATENT DOCUMENTS

| | | |
|---|---|---|
| CN | 101539541 A | 9/2009 |
| WO | 2017201247 A1 | 11/2017 |

(Continued)

OTHER PUBLICATIONS

Yinghui Lu, Jennifer E. Michaels, "Feature Extraction and Sensor Fusion for Ultrasonic Structural Health Monitoring Under Changing Environmental Conditions" IEEE Sensors Journal, vol. 9, No. 11, Nov. 2009.

*Primary Examiner* — Suman K Nath
(74) *Attorney, Agent, or Firm* — Armstrong Teasdale LLP

(57) ABSTRACT

A system for detecting damage in an aircraft structure includes an aircraft structure and a structural health monitoring (SHM) system for monitoring the health of the aircraft structure independent of temperature. The SHM system includes an actuator bonded to the aircraft structure and configured to generate a reference vibration signal having a reference amplitude that propagates through the aircraft structure at a first time, and generate a comparison vibration signal having a comparison amplitude that propagates through the aircraft structure at a second time after the first time. The comparison amplitude represents damage incurred by the aircraft structure between the first time and the second time. The SHM system includes a sensor bonded to the aircraft structure that receives the reference vibration signal and the comparison vibration signal, and a processor configured to compute a gain damage index as a function of the reference amplitude divided by the comparison amplitude.

20 Claims, 5 Drawing Sheets

(56) References Cited

U.S. PATENT DOCUMENTS

| | | | |
|---|---|---|---|
| 7,925,455 B2* | 4/2011 | Pado | G01N 29/043 |
| | | | 702/36 |
| 8,892,384 B2 | 11/2014 | Pado | |
| 9,506,836 B2* | 11/2016 | Pado | G01M 5/0066 |
| 2008/0255771 A1 | 10/2008 | Beard | |
| 2009/0157358 A1 | 6/2009 | Kim | |
| 2012/0323517 A1 | 12/2012 | Pado | |
| 2016/0116366 A1 | 4/2016 | Da Silva et al. | |
| 2017/0285114 A1 | 10/2017 | Bickel et al. | |
| 2017/0324106 A1 | 11/2017 | Sinha et al. | |
| 2017/0336481 A1 | 11/2017 | Latham et al. | |
| 2017/0367613 A1 | 12/2017 | Eckert et al. | |
| 2018/0028125 A1 | 2/2018 | Liou et al. | |
| 2018/0058006 A1 | 3/2018 | Meier et al. | |
| 2018/0143298 A1 | 5/2018 | Newman | |

FOREIGN PATENT DOCUMENTS

| | | |
|---|---|---|
| WO | 2018032106 A1 | 2/2018 |
| WO | 2018081657 A2 | 5/2018 |
| WO | 2018089044 A1 | 5/2018 |
| WO | 2018101920 A1 | 6/2018 |

* cited by examiner

SYSTEM FOR TEMPERATURE INSENSITIVE DAMAGE DETECTION

FIELD

The field of the disclosure relates generally to structural health monitoring (SHM) and, more specifically, to systems and methods for temperature insensitive damage detection.

BACKGROUND

At least some SHM systems detect damage in a structure by generating a vibration signal, or wave, by exciting a piezoelectric transducer, or actuator, bonded to the structure, for example, and then receiving that vibration signal with another piezoelectric transducer bonded to the structure at a different location. Damage present in the structure in the path of the propagating wave affects properties of the propagating wave, such as, for example, amplitude and phase. Accordingly, comparing amplitude and phase of a received vibration signal (the comparison signal) to the amplitude and phase of a previously-received vibration signal (the reference signal) enables detection of damage occurring in the duration between the reference signal and the comparison signal. Further, such a comparison enables detection of damage at a location in the structure along the path of the propagating wave.

Propagation of a wave through the structure is also affected by environmental parameters, including, for example, ambient temperature where the SHM system is operating on the structure. Generally, amplitude of the vibration signal propagating through the structure is increased in warmer temperatures, and decreased in cooler temperatures. Ambient temperature can further alter, or shift, the phase of the propagating wave. Such environmental effects can mask damage in the structure, i.e., false-negative, or at least interfere with its detection. Conversely, environmental effects can produce false-positive detection of damage.

At least some SHM systems utilize algorithms or other signal processing to both quantify damage in a given structure under testing, and to mitigate the effects of environmental interference, e.g., temperature interference. Quantification of damage is referred to as a damage index (DI). Such quantifications enable monitoring of structural health in a given structure periodically over time. One such algorithm for computing DI is to compute a root mean square (RMS) of an "error" signal or, in other words, the RMS of the difference between the comparison signal and the reference signal. Various methods exist for mitigating environmental interference. For example, one method is to collect reference signals at various temperatures and selecting an appropriate one to compare to the comparison signal. However, such a method is time consuming and requires coolers, ovens, and other means of ambient temperature control to produce the various temperatures over a range of temperatures, e.g., from 13 degrees Fahrenheit to 120 degrees Fahrenheit. Another example method is to use a computed correlation between the comparison and reference signals, which mitigates at least some amplitude interference, but may mask damage from detection. Yet another example method is to measure and correct for phase shifts induced by environmental interference, as is explained in U.S. Pat. No. 8,892,384, the contents of which are hereby incorporated herein by reference. A need exists, however, for an SHM system that produces a DI that mitigates effects of temperature interference while reducing false-positives and false-negatives.

This Background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is directed to a system for detecting damage in an aircraft structure. The system includes an aircraft structure and a structural health monitoring (SHM) system having an actuator, a sensor, and a processor. The actuator is bonded to the aircraft structure and is configured to generate a reference vibration signal having a reference amplitude that propagates through the aircraft structure at a first time. The actuator is further configured to generate a comparison vibration signal having a comparison amplitude that propagates through the aircraft structure at a second time after the first time. The comparison amplitude represents damage incurred by the aircraft structure between the first time and the second time. The sensor is bonded to the aircraft structure and configured to receive the reference vibration signal and the comparison vibration signal. The processor is configured to compute a gain damage index as a function of the reference amplitude divided by the comparison amplitude. The gain damage index enables the SHM system to monitor the structural health of the aircraft structure independent of temperature.

Another aspect is a method of detecting damage in a structure. The method includes retrieving a reference vibration signal for the structure from a memory, wherein the reference vibration signal was previously collected. The method includes energizing a first transducer bonded to the structure to generate a comparison vibration signal that propagates through the structure. The method includes receiving the comparison vibration signal at a second transducer bonded to the structure. The method includes executing a gain damage index algorithm utilizing the reference vibration signal and the comparison vibration signal to compute a gain damage index as a function of an amplitude of the reference vibration signal multiplied by an amplitude of the comparison vibration signal, divided by a square of the amplitude of the comparison vibration signal. The method includes identifying damage in the structure when the gain damage index is positive.

Yet another aspect includes a structural health monitoring (SHM) system having a plurality of transducers, a data acquisition (DAQ) circuit, and a processor. The plurality of transducers is configured to be distributed over an area of a structure and bonded to the structure. The plurality of transducers includes a first transmitting transducer and at least one sensor transducer. The DAQ circuit is coupled to the plurality of transducers and is configured to actuate the first transmitting transducer to generate a reference vibration signal that propagates through the structure at a first time. The DAQ circuit is configured to receive the reference vibration signal via the at least one sensor transducer. The DAQ circuit is configured to actuate the first transmitting transducer to generate a comparison vibration signal that propagates through the structure at a second time, after the first time. The DAQ circuit is configured to receive the comparison vibration signal via the at least one sensor transducer. The processor is configured to compute respective gain damage indices for the at least one receiving transducer as a function of an amplitude of the reference vibration signal divided by an amplitude of the comparison vibration signal, the gain damage indices enabling the SHM system to monitor the structural health of the aircraft structure independent of temperature.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Figure 1:
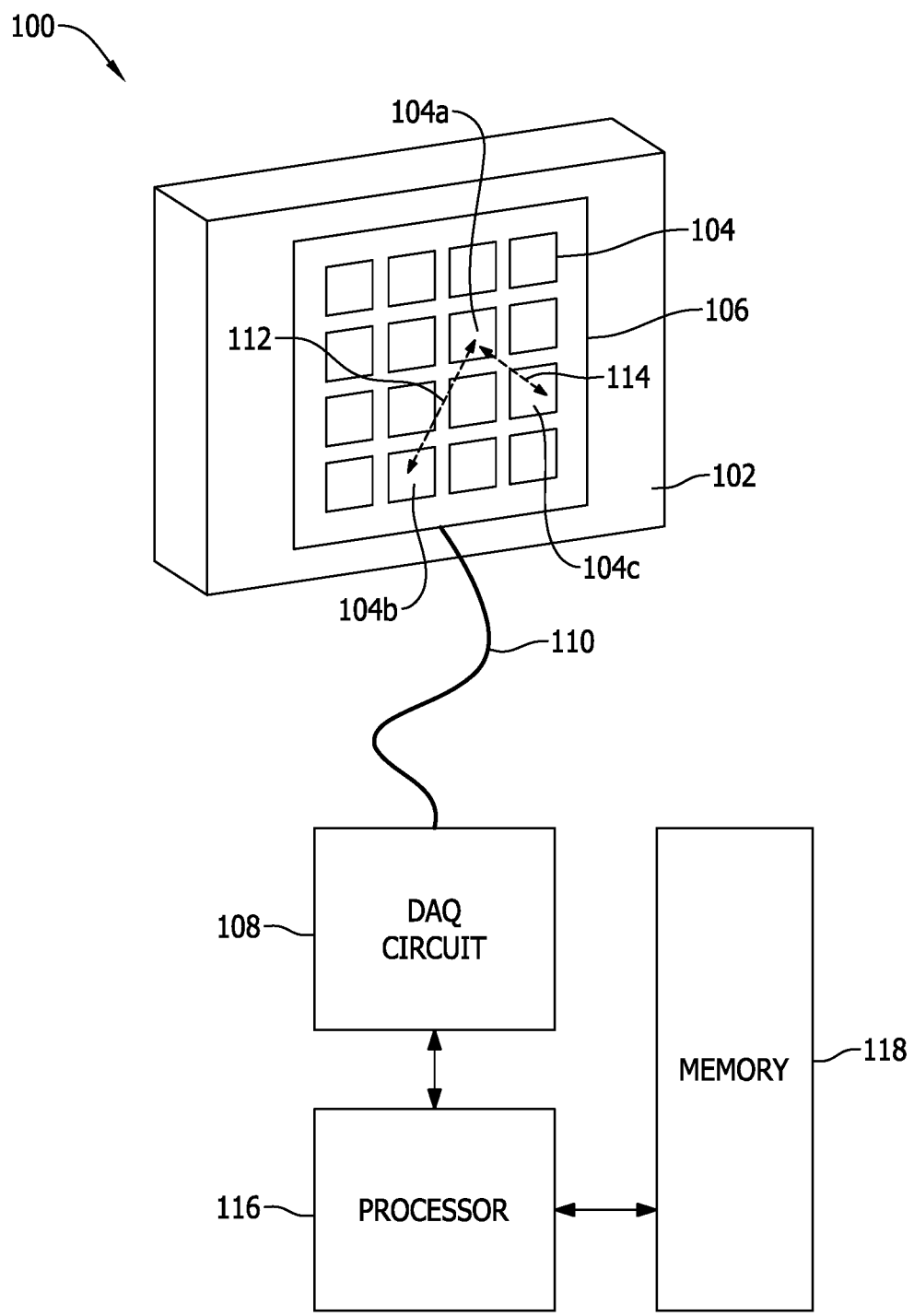
FIG. 1 is a schematic block diagram of an example SHM system.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the systems described include a structural health monitoring (SHM) system that computes a gain damage index (DI) that enables detection of damage in a structure, such as, for example, an aircraft structure, independent of temperature. SHM systems described herein include a plurality of transducers distributed over an area of a structure, and bonded to the surface of the structure. Each transducer is configured to be excited to generate a vibration signal that propagates through the structure and is then received at each other transducer in the plurality. Transducers, when excited, are referred to as actuators, or transmitters. Accordingly, other transducers in the plurality are referred to as sensors, or receivers. An actuator transducer first generates a reference vibration signal that propagates through the structure and is received by at least one sensor transducer, collected by a data acquisition (DAQ) circuit, and stored in memory. The actuator transducer then later generates a comparison vibration signal that propagates through the structure and is received by the sensor transducer and collected by the DAQ circuit. A processor then computes a gain DI as a function of an amplitude of the reference vibration signal divided by an amplitude of the comparison vibration signal. More specifically, the processor computes respective gain DIs for a plurality of sensor transducers, each gain DI computed as a function of the amplitude of the reference vibration signal multiplied by the amplitude of the comparison vibration signal, divided by a square of the amplitude of the comparison vibration signal. Damage that occurs in the duration between the time at which the reference vibration signal is generated and the time at which the comparison vibration signal is generated, is identified when the gain DI is positive. A positive gain generally refers to a gain greater than one. In certain embodiments, the gain DI is normalized to zero by subtracting one from the gain value, such that a "positive gain" refers instead to a gain value greater than zero. Each gain DI value represents a quantification of the health of the structure, e.g., a metal structure or a composite structure, along the path between the actuator transducer and the sensor transducer for that gain DI value. Accordingly, this quantification enables monitoring of the structural health of the structure periodically over time.

FIG. 1 is a schematic diagram of an example SHM system 100 for detecting damage, such as a crack or delamination, in a structure 102. SHM system 100 includes a plurality of transducers 104 bonded to the surface of structure 102. Transducers 104 are distributed over an area of structure 102 and are arranged, for example, in an array 106 or any other suitable arrangement for testing structure 102. For aircraft structures, for example, transducers 104 may be arranged such that they are concentrated on high-stress areas of the given aircraft structure, which may be constructed of metal materials or composite materials having multiple layers, or laminations, for example. Transducers 104 may include ceramic piezoelectric transducers, such as, for example, a lead zirconate titanate (PZT) transducer. When a voltage is applied to one of transducers 104 bonded to structure 102, the transducer is actuated and generates a vibration, or vibration signal, that propagates through structure 102. The resulting waveform exhibits some amplitude, phase, and frequency. In the embodiments of SHM system 100 described herein, transducers 104 typically generate a vibration signal having a frequency in the range of about 200 kilohertz to about 450 kilohertz. However, in alternative embodiments, transducers 104 that generate vibration signals outside of that range may be utilized and are within the scope of this disclosure.

Transducers 104 are coupled to a DAQ circuit 108 by a wire bundle 110. DAQ circuit 108 may include a plurality of analog input/output channels for applying or measuring potential across transducers 104. Measured potentials, for example, may be converted to digital values by one or more analog-to-digital converter within DAQ circuit 108. DAQ circuit 108 controls energization of transducers 104 to generate vibration signals, and receives vibration signals through sensor transducers 104. More specifically, for example, DAQ circuit 108 selects an actuator transducer 104a to operate as a transmitter while others of transducers 104 operate as receivers, otherwise referred to as sensor transducers 104b and 104c, for example. DAQ circuit 108 applies a voltage to actuator transducer 104a that results in generation of a reference vibration signal that propagates through structure 102 along, for example, paths 112 and 114 to sensor transducers 104b and 104c, respectively. Sensor transducers 104*b* and 104*c* receive the reference vibration signal, thereby generating an electrical potential, or voltage, across the terminals of the device. The voltage that presents across a given sensor transducer over time represents the reference vibration signal for that sensor transducer and, more specifically, for the respective path between the actuator transducer and that sensor transducer, such as, for example, paths 112 and 114 between actuator transducer 104*a* and sensor transducers 104*b* and 104*c*, respectively.

SHM system 100 includes a processor 116 and a memory 118. Processor 116 executes a series of computer executable instructions, program code, or software, stored in memory, such as memory 118. By executing such program code, processor 116 is configured to carry out various steps toward computing a gain DI. For example, in executing program code stored in memory 118, processor 116 is configured to receive the reference vibration signal from DAQ circuit 108. Processor 116 is further configured to write the reference vibration signal to memory 118. In certain embodiments, processor 116 may process the reference vibration signal prior to writing to memory 118. In alternative embodiments, the reference vibration signal may be written directly from DAQ circuit 108 to memory 118.

DAQ circuit 108 controls transducers 104 such that reference vibration signals are generated and collected at a first time, for example, when the structure is new or otherwise known to be undamaged. DAQ circuit 108 controls transducers 104 to generate comparison vibrations signals at a second time, after the first time. SHM system 100 may be utilized periodically to test the structural health of structure 102. For example, the duration between collecting the reference vibration signals and the comparison vibration signals may be one or more years of operation. Alternatively, the duration may be much shorter, on the order of days, weeks, or months, for example. SHM system 100 is capable of detecting damage independent of the duration between collections, or "scans." Such detections are simply limited to the duration between collection of the reference vibration signals and the comparison vibration signals. Durations are generally selected based on expected wear and fatigue over the lifecycle of structure 102. In certain embodiments, transducers 104 are left in place, bonded to structure 102, over the duration between collections. In other embodiments, transducers 104 are bonded to structure 102 for collecting the reference vibration signals, and removed thereafter for normal operation or use of structure 102. Transducers 104 are then bonded again to structure 102 at a later time to collect the comparison vibration signals. Generally, transducers 104 should be place at approximately the same locations for collecting the reference vibration signals and the comparison vibration signals.

Figure 2A:
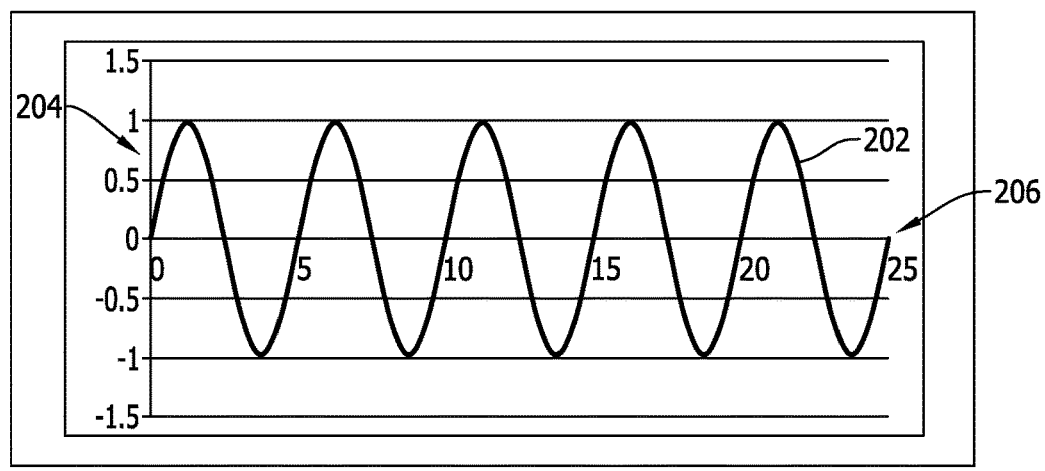
FIG. 2A is a plot of an example reference vibration signal from an SHM system.

FIG. 2A is a plot of an example reference vibration signal 202 from an SHM system and a given structure under test, such as SHM system 100 shown in FIG. 1. Reference vibration signal 202 is plotted as amplitude 204 over time 206. Amplitude 204 is expressed in volts, with reference vibration signal 202 ranging from about 1 volt to about −1 volt, over a duration of about 25 microseconds. Reference vibration signal 202 has a frequency of about 200 kilohertz (or about a 5 microsecond period).

Referring again to FIG. 1, for collecting the comparison vibration signals, DAQ circuit 108 selects actuator transducer 104*a* to operate as a transmitter while others of transducers 104 operate as receivers, otherwise referred to as sensor transducers 104*b* and 104*c*, for example. DAQ circuit 108 applies a voltage to actuator transducer 104*a* that results in generation of a comparison vibration signal that propagates through structure 102 along, for example, paths 112 and 114 to sensor transducers 104*b* and 104*c*, respectively. Sensor transducers 104*b* and 104*c* receive the comparison vibration signal, thereby generating an electrical potential, or voltage, across the terminals of the device. The voltage that presents across a given sensor transducer over time represents the comparison vibration signal for that sensor transducer and, more specifically, for the respective path between the actuator transducer and that sensor transducer, such as, for example, paths 112 and 114 between actuator transducer 104*a* and sensor transducers 104*b* and 104*c*, respectively.

Figure 2B:
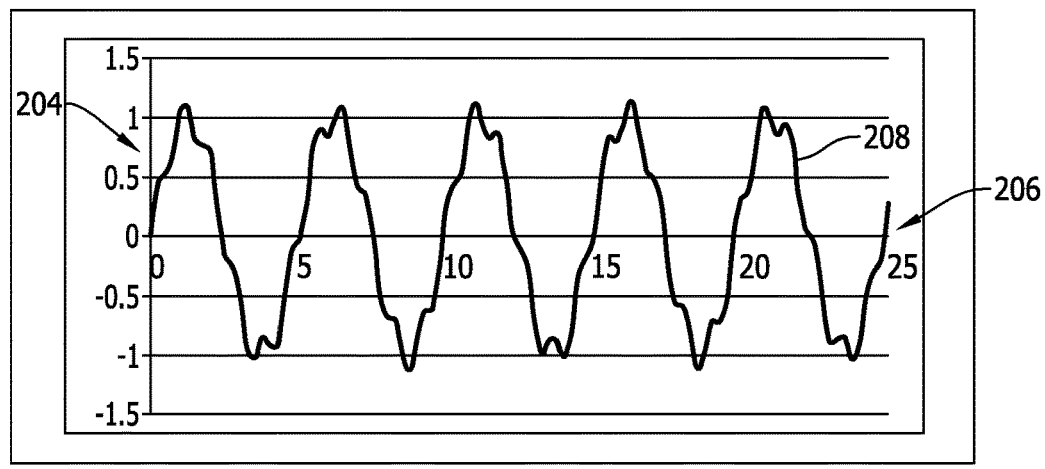
FIG. 2B is a plot of an example comparison vibration signal from an SHM system.

FIG. 2B is a plot of an example comparison vibration signal 208 from an SHM system and a given structure under test, such as SHM system 100 shown in FIG. 1. Comparison vibration signal 208 is plotted as amplitude 204 over time 206. Amplitude 204 is expressed in volts, with comparison vibration signal 208 ranging from about 1.1 volt to about −1.1 volt, over a duration of about 25 microseconds. Comparison vibration signal 208 has a frequency of about 200 kilohertz (or about a 5 microsecond period). Notably, the amplitude and phase of comparison vibration signal 208 are distorted with respect to reference vibration signal 202 shown in FIG. 2A.

Referring again to FIG. 1, damage that occurs within structure 102 during the duration between collections is represented in the comparison vibration signals as variations in amplitude and phase of the comparison vibration signals relative to corresponding reference vibration signals. Further, variations in amplitude and phase may also be induced by differences in ambient temperature when the reference vibration signals are collected versus when the comparison vibration signals are collected.

Figure 2C:
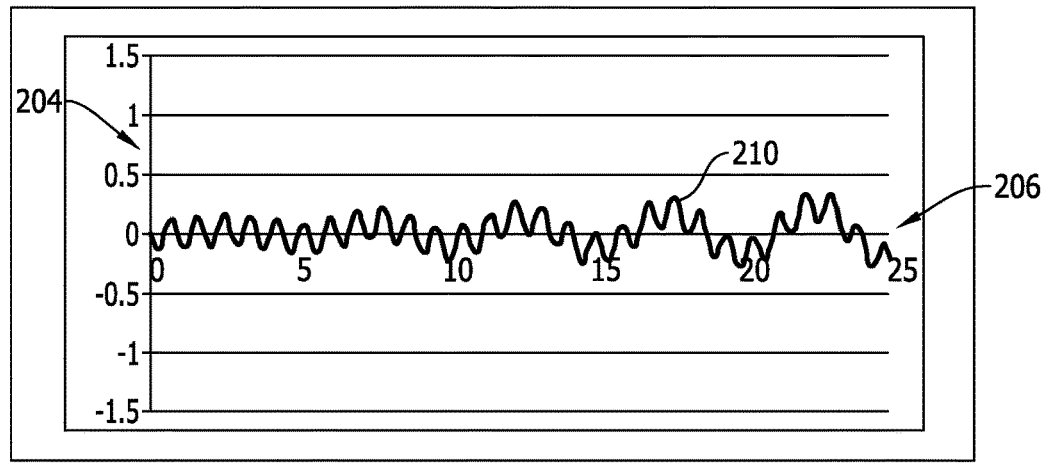
FIG. 2C is a plot of an example error signal from the reference vibration signal and the comparison vibration signal shown in FIGS. 2A and 2B, respectively.

FIG. 2C is a plot of an example error signal 210 from reference vibration signal 202 and comparison vibration signal 208 shown in FIGS. 2A and 2B, respectively. Error signal 210 is plotted as amplitude 204 over time 206. Amplitude 204 is expressed in volts, with error signal 210 ranging from about 0.25 volt to about −0.25 volt, over a duration of about 25 microseconds. Error signal 210 represents a rough DI, where larger amplitudes generally indicate greater damage. Notably, error signal 210 does not account, for example, for variations in temperature between collecting reference vibration signal 202 and comparison vibration signal 208.

Referring again to FIG. 1, for each path between transducers 104, e.g., paths 112 and 114, processor 116 retrieves the reference vibration signal from memory 118 and receives the corresponding comparison vibration signal from DAQ circuit 108. Processor 116 is configured to compute a gain DI as a function of the amplitude of the reference vibration signal (the reference amplitude) divided by the amplitude of the comparison vibration signal (the comparison amplitude). The gain DI represents the "gain" necessary to make the amplitude of comparison vibration signal match the amplitude of the reference signal. According to typical "gain" notation, a gain of greater than one is referred to as a "positive" gain, because application of such a gain would increase the amplitude of the resultant signal. Likewise, a gain of less than one is referred to as a "negative" gain, because application of such a gain would reduce the amplitude of the resultant signal. Under such notation, a "positive" gain DI indicates the comparison amplitude is less than the reference amplitude, and further indicates damage has occurred in structure 102 along the path between transducers, e.g., path 112 or 114. Generally, damage suppresses the amplitude of the wave as it propagates through structure 102. Likewise, the temperature at which the comparison vibration signal is collected, when compared to the temperature at which the reference vibration signal was collected, affects the amplitude and phase of the comparison vibration signal.

Figure 3A:
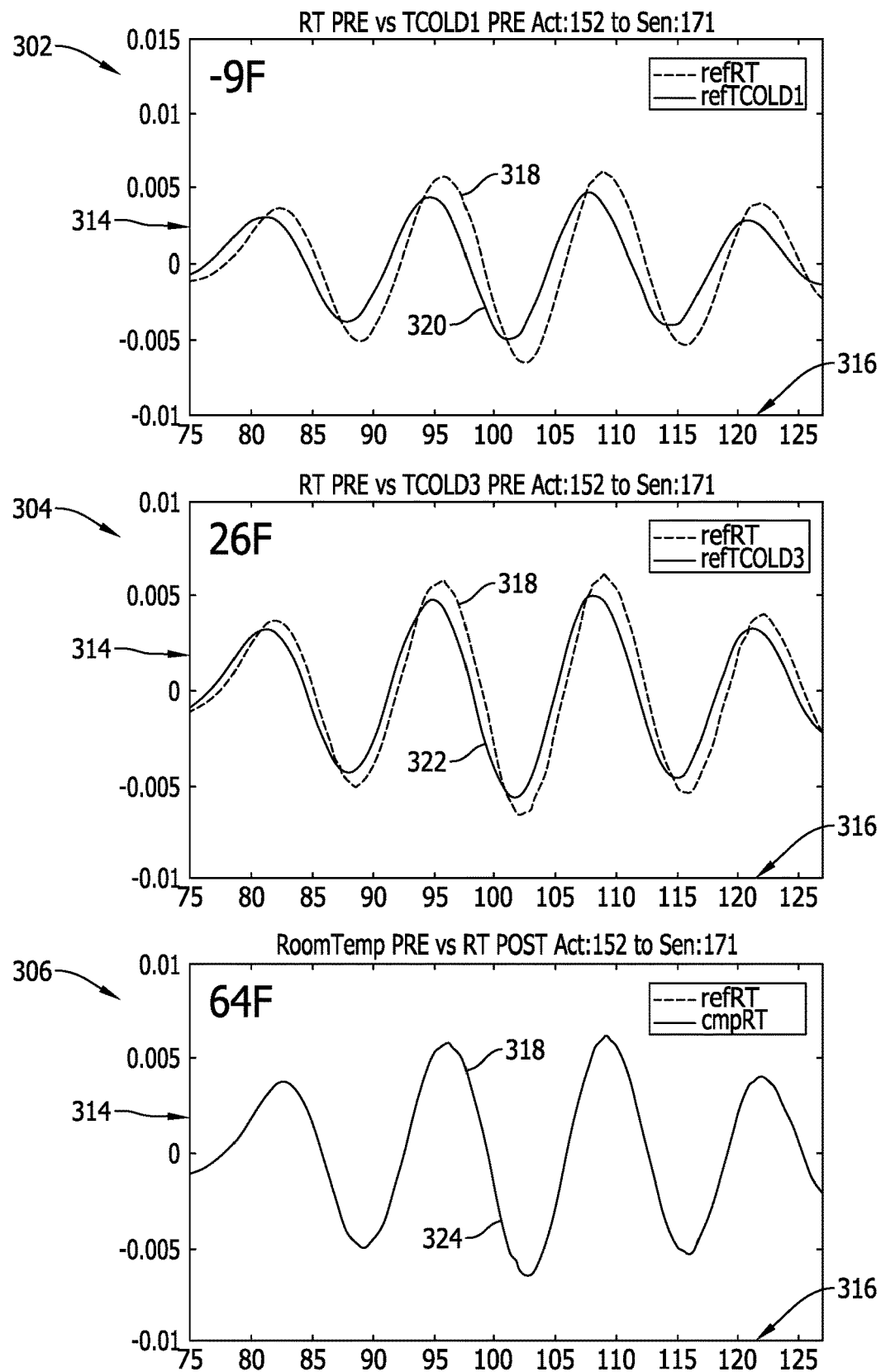
FIGS. 3A and 3B are a series of plots of an example reference vibration signal and example comparison vibration signals collected at various temperatures.
Figure 3B:
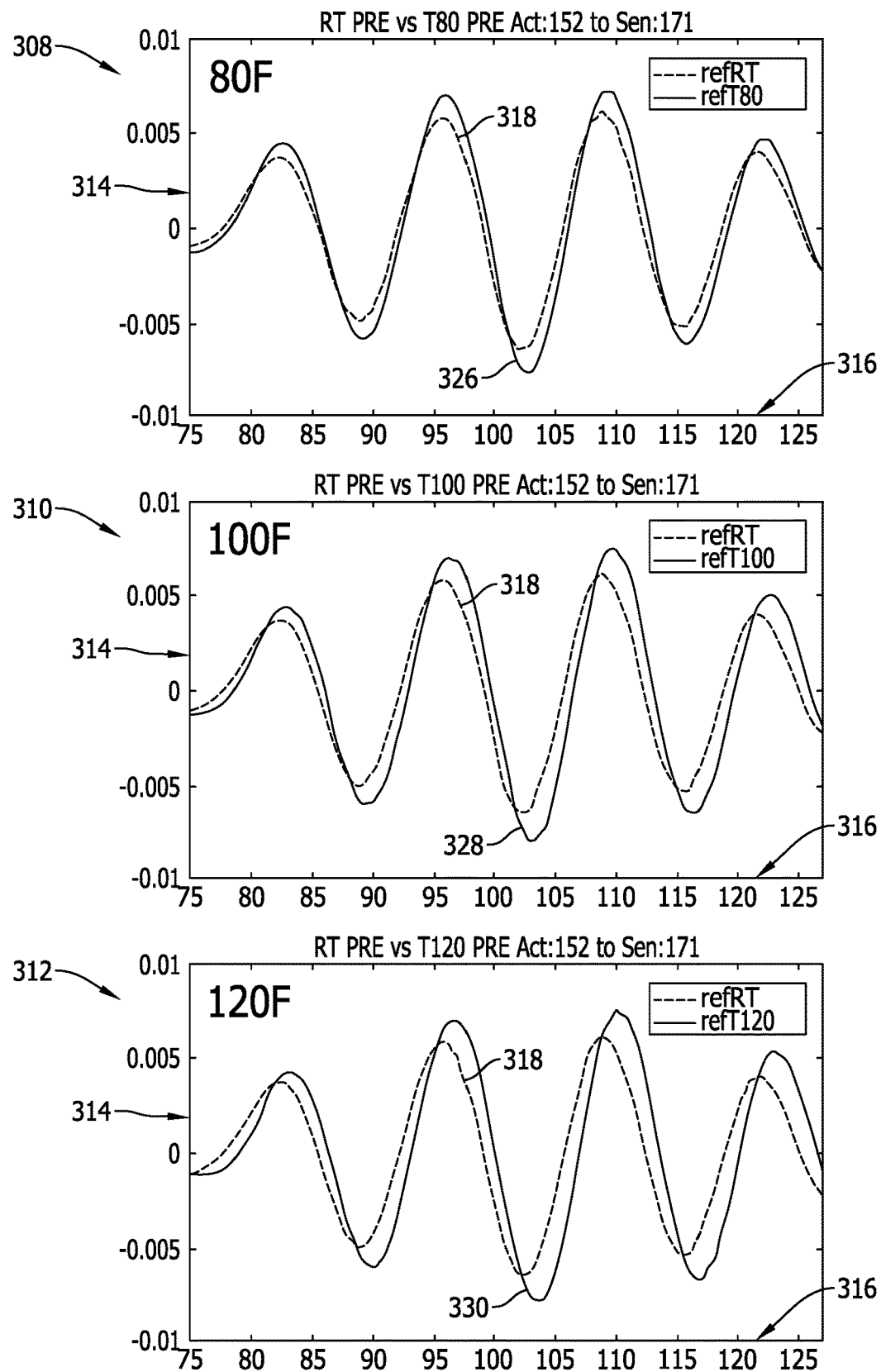

FIGS. 3A and 3B are a series of plots 302, 304, 306, 308, 310, and 312 of an example reference signal and example comparison signals collected at various temperatures using an SHM system and a given structure under test, such as SHM system 100 shown in FIG. 1. Notably, the reference signal and comparison signals were collected at about the same time, without any intervening wear, fatigue, or other damage to the structure under test. Accordingly, plots 302, 304, 306, 308, 310, and 312 illustrate the effects, in phase and amplitude, of temperature variation between collection of a reference vibration signal versus collection of a comparison signal, expressed in voltage 314 over time 316. Plot 302 illustrates a reference vibration signal 318 collected at 64 degrees Fahrenheit (F), or about room temperature, and a comparison vibration signal 320 collected at −9 degrees F. The cooler temperature at which comparison vibration signal 320 was collected is reflected in at least the reduced amplitude of comparison vibration signal 320 with respect to the amplitude of reference vibration signal 318. Comparison vibration signal 320 also exhibits some negative phase shift when compared to reference vibration signal 318.

Plot 304 illustrates reference vibration signal 318 collected at 64 degrees F., or about room temperature, and a comparison vibration signal 322 collected at 26 degrees F. The cooler temperature at which comparison vibration signal 322 was collected is reflected in at least the reduced amplitude of comparison vibration signal 322 with respect to the amplitude of reference vibration signal 318, although to a lesser degree than in comparison vibration signal 320 shown in plot 302. Comparison vibration signal 322 also exhibits some negative phase shift when compared to reference vibration signal 318, although, again, to a lesser degree than in comparison vibration signal 320 shown in plot 302.

Plot 306 illustrates reference vibration signal 318 collected at 64 degrees F., or about room temperature, and a comparison vibration signal 324 also collected at 64 degrees F. The equal temperature results in reference vibration signal 318 and comparison vibration signal 324 being indistinguishable in plot 306.

Plot 308 illustrates reference vibration signal 318 collected at 64 degrees F., or about room temperature, and a comparison vibration signal 326 collected at 80 degrees F. The warmer temperature at which comparison vibration signal 326 was collected is reflected in at least the increased amplitude of comparison vibration signal 326 with respect to the amplitude of reference vibration signal 318. Comparison vibration signal 326 also exhibits some small positive phase shift when compared to reference vibration signal 318.

Plot 310 illustrates reference vibration signal 318 collected at 64 degrees F., or about room temperature, and a comparison vibration signal 328 collected at 100 degrees F. The warmer temperature at which comparison vibration signal 328 was collected is reflected in at least the increased amplitude of comparison vibration signal 328 with respect to the amplitude of reference vibration signal 318, although to a greater degree than in comparison vibration signal 326 shown in plot 308. Comparison vibration signal 328 also exhibits some positive phase shift when compared to reference vibration signal 318, although, again, to a greater degree than in comparison vibration signal 326 shown in plot 308.

Plot 312 illustrates reference vibration signal 318 collected at 64 degrees F., or about room temperature, and a comparison vibration signal 330 collected at 120 degrees F. The warmer temperature at which comparison vibration signal 330 was collected is reflected in at least the increased amplitude of comparison vibration signal 330 with respect to the amplitude of reference vibration signal 318, although to a greater degree than in comparison vibration signals 326 and 328 shown in plots 308 and 310, respectively. Comparison vibration signal 330 also exhibits positive phase shift when compared to reference vibration signal 318, although, again, to a greater degree than in comparison vibration signals 326 and 328 shown in plot 308 and 310, respectively.

Referring again to FIG. 1, and more specifically, the gain DI is computed as a function of the reference amplitude multiplied by the comparison amplitude, and divided by a square of the comparison amplitude, which yields an "instantaneous" gain DI. The reference vibration signal and the comparison vibration signal are generally collected as amplitude samples over a period of time, referred to as a time series. The gain DI for a reference time series and a comparison time series, each having N samples, is represented by the following algorithm:

$$Gain' = \frac{\sum_{n=0}^{N-1} Ref(n)Comp(n)}{\sum_{n=0}^{N-1} Comp^2(n)} \qquad \text{EQ. 1}$$

where Ref represents the reference time series, Comp represents the comparison time series, and n is an index into the time series. At least some SHM systems utilize the gain computation shown in EQ. 1 as a pre-processing step for computing a DI. For example, some SHM systems utilize a mean squared error (MSE) DI that utilizes a gain computation similar to that shown in EQ. 1 as an intermediate step, not the DI itself. Referring again to the gain DI, generally, a "positive" gain DI indicates the existence of damage. The location of the damage in the structure is along the given path between the actuator transducer and the sensor transducer. A "negative" gain DI indicates no damage along that given path. A negative gain DI can be generally associated with an increase in temperature at which the comparison vibration signal is collected when compared to the temperature at which the reference vibration signal was collected, e.g., room temperature, because damage to structure 102 generally does not result in an increased amplitude of the comparison vibration signal. Conversely, a positive gain DI can be associated with both a decrease in temperature at which the comparison vibration signal is collected and damage occurring along the path between transducers 104. However, cooler temperatures affect the amplitude of the comparison vibration signal to a lesser degree than damage, enabling differentiation between the effects. Accordingly, the gain DI more enables a more certain detection of the existence or non-existence of damage, such as cracks or delaminations, in the structure under test. Conversely, DIs such as MSE and correlation coefficients do not consider the direction, or sign, of amplitude differences between the reference vibration signal and the comparison vibration signal.

To make the gain DI evaluation more intuitive, in certain embodiments, the gain DI is normalized to zero:

$$\text{Gain } DI = \text{Gain}' - 1 \qquad \text{EQ. 2}$$

Accordingly, a "positive" gain DI corresponds to a gain value greater than zero, while a "negative" gain DI corresponds to a gain value less than zero.

In certain embodiments, processor 116 is further configured to measure and remove phase shift in the comparison vibration signal due to temperature variation between the time at which the reference vibration signal is collected and the time at which the comparison vibration signal is collected. Such phase shift correction enables accurate comparison, in time, of the reference vibration signal and the comparison vibration signal. For example, when the comparison vibration signal is out of phase from the reference vibration signal, the amplitude of a given peak in the comparison vibration signal will be skewed in time from the corresponding peak in the reference vibration signal. Generally, as explained in U.S. Pat. No. 8,892,384, temperature creates a progressively larger phase shift over time, where the phase shift grows linearly, or "stretches," over time, particularly in homogeneous structures, such as metal. Non-homogeneous structures, such as composites, tend to produce non-linear growth in phase shift over time. Such stretching is sometimes referred to as phase shift as measured by time delay. Damage tends to create phase shifts that grow non-linearly over time. Accordingly, phase shift in the comparison vibration signal due to temperature is approximated and corrected for before processor 116 computes the gain DI according to EQ. 1, above.

More specifically, to correct for phase shift in the comparison vibration signal due to temperature, processor 116 divides the comparison vibration signal and the reference vibration signal over a plurality of time windows, or otherwise samples the comparison vibration signal and the reference vibration signal. Processor 116 then computes a cross-correlation between the comparison vibration signal and the reference vibration signal for each time window. The cross-correlation is determined by computing an amount of time shift required to maximally correlate the comparison vibration signal and the reference vibration signal for a given time window. A weighted regression is then performed on time to estimate time delay, where the weights are based on a relative amount of signal energy from the reference vibration signal in each time window. The weighted regression using time window energy as the weighting function maximizes the effectiveness of the phase shift compensation by focusing on the most important sections of the signal. The weighted regression yields a relationship between time and time shift as a quadratic or higher order equation. The relationship then enables processor 116 to correct for the phase shift in the comparison vibration signal.

Figure 4:
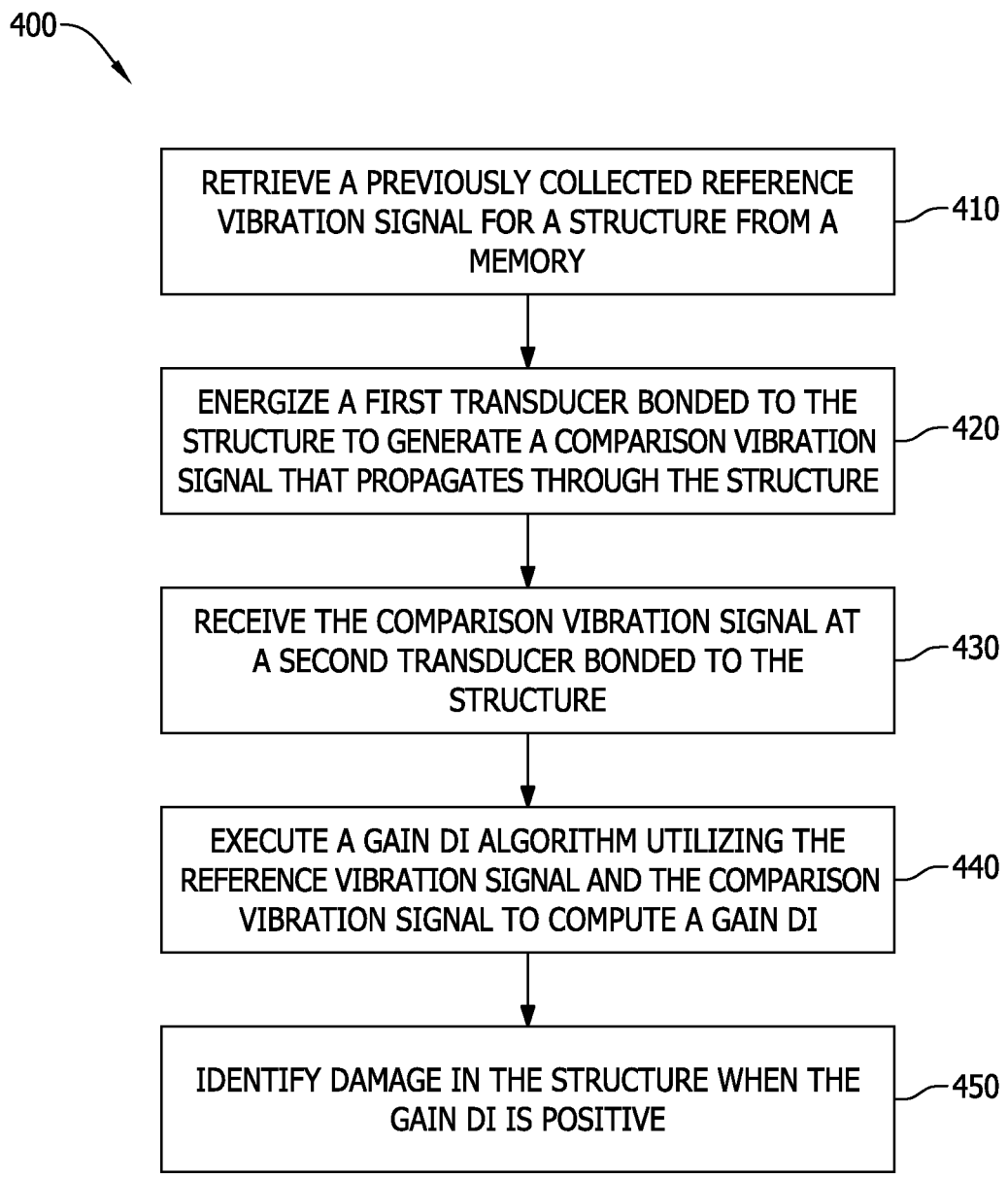
FIG. 4 is a flow diagram of an example method of detecting damage in a structure.

FIG. 4 is a flow diagram of an example method 400 of detecting damage in a structure using an SHM system, such as SHM system 100 shown in FIG. 1. At a first time, SHM system 100 energizes, for example, actuator transducer 104$a$ to generate a reference vibration signal that propagates through structure 102 and is received, for example, at sensor transducers 104$b$ and 104$c$. The collected reference vibration signal is then stored in memory 118 until it is needed for subsequent testing with SHM system 100. The previously-collected reference vibration signal is retrieved 410 from memory. Actuator transducer 104$a$ is again energized 420 to generate a comparison vibration signal that propagates through structure 102. The comparison vibration signal is then received 430 at sensor transducers 104$b$ and 104$c$.

Processor 116 receives both the reference vibration signal and the comparison vibration signal for each path 112 and 114, and executes 440 a gain DI algorithm, such as that shown in EQ. 1, using corresponding pairs of reference vibration signal and comparison vibration signal to compute a gain DI. Damage along, for example, path 112 and 114 is identified 450 when the respective gain DI for that path is positive.

Example technical effects of the methods, systems, and apparatus described herein include at least one of: (a) mitigating the effects of temperature on amplitude and phase of comparison vibration signals with respect to reference vibration signals; (b) detecting damage in a structure under test independent of temperature variations between collection of reference vibration signals and comparison vibration signals; (c) improving false positive rates and false negative rates for damage detection in structures such as metals and composites; and (d) reducing time required for reference vibration signal collection by eliminating the need to collect reference vibration signals at more than one temperature.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the embodiments described herein, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for detecting aircraft structure damage, the system comprising:
   an aircraft structure; and
   a structural health monitoring (SHM) system configured to monitor structural health of the aircraft structure, the SHM system comprising:
   an actuator bonded to the aircraft structure and configured to:
      generate a reference vibration signal having a reference amplitude that propagates through the aircraft structure at a first time, and
      generate a comparison vibration signal having a comparison amplitude that propagates through the aircraft structure at a second time after the first time, the comparison amplitude representing damage incurred by the aircraft structure between the first time and the second time;
   a sensor bonded to the aircraft structure and configured to receive the reference vibration signal and the comparison vibration signal; and
   a processor configured to compute a gain damage index as a function of the reference amplitude divided by the comparison amplitude, the gain damage index enabling the SHM system to monitor the structural health of the aircraft structure independent of temperature.

2. The system of claim 1, wherein the gain damage index indicates existence or non-existence of a crack in the aircraft structure.

3. The system of claim 1, wherein the aircraft structure comprises a composite structure having a plurality of laminations.

4. The system of claim 1, wherein the actuator comprises a lead zirconate titanate (PZT) transducer.

5. The system of claim 1, wherein the processor is further configured to remove a phase shift in the comparison vibration signal due to a temperature variation between the first time and the second time.

6. The system of claim 1, wherein the processor is further configured to compute the gain damage index as a function of the reference amplitude multiplied by the comparison amplitude, divided by a square of the comparison amplitude.

7. The system of claim 6, wherein a positive gain damage index indicates existence of damage.

8. A method of detecting damage in a structure, the method comprising:
   retrieving a reference vibration signal for the structure from a memory, wherein the reference vibration signal was previously collected;
   energizing a first transducer bonded to the structure to generate a comparison vibration signal that propagates through the structure;
   receiving the comparison vibration signal at a second transducer bonded to the structure;
   computing, based on the reference vibration signal and the comparison vibration signal, a gain damage index as a function of an amplitude of the reference vibration signal multiplied by an amplitude of the comparison vibration signal, divided by a square of the amplitude of the comparison vibration signal; and
   identifying damage in the structure when the gain damage index is positive.

9. The method of claim 8 further comprising:
   detecting a phase shift in the comparison vibration signal due to a variation in temperature at which the comparison vibration signal is received relative to the temperature at which the reference vibration signal was previously collected; and
   removing the phase shift from the comparison vibration signal before computing the gain damage index.

10. The method of claim 9, wherein detecting and removing the phase shift comprises:
    dividing the comparison vibration signal and the reference vibration signal over a plurality of time windows;
    computing a cross-correlation between the comparison vibration signal and the reference vibration signal for each of the plurality of time windows by computing an amount of time shift needed to maximally correlate the comparison vibration signal and the reference vibration signal;
    performing a weighted regression to estimate time shift as a function of time; and
    correcting the phase shift in the comparison vibration signal as a function of time.

11. The method of claim 8 further comprising:
    energizing a third transducer, bonded to the structure at approximately a location of the first transducer and prior to bonding the first transducer, to generate the reference vibration signal;

receiving the reference vibration signal at a fourth transducer bonded to the structure at approximately a location of the second transducer and prior to bonding the second transducer; and storing the reference vibration signal in the memory.

12. The method of claim 11, wherein a first temperature at which the reference vibration signal is received by the fourth transducer is at least 20 degrees Fahrenheit different from a second temperature at which the comparison vibration signal is received by the second transducer.

13. The method of claim 8, wherein identifying damage in the structure comprises detecting a crack in the structure.

14. A structural health monitoring (SHM) system, comprising:
a plurality of transducers configured to be distributed over an area of, and bonded to, a structure, the plurality of transducers including a first transmitting transducer and at least one sensor transducer;
a data acquisition (DAQ) circuit coupled to the plurality of transducers and configured to:
actuate the first transmitting transducer to generate a reference vibration signal that propagates through the structure at a first time;
receive the reference vibration signal via the at least one sensor transducer;
actuate the first transmitting transducer to generate a comparison vibration signal that propagates through the structure at a second time, after the first time; and
receive the comparison vibration signal via the at least one sensor transducer; and
a processor configured to compute respective gain damage indices for the at least one sensor transducer as a function of an amplitude of the reference vibration signal divided by an amplitude of the comparison vibration signal, the respective gain damage indices enabling the SHM system to monitor the structural health of the structure independent of temperature.

15. The SHM system of claim 14, wherein the processor is further configured to:
utilize the reference vibration signal and the comparison vibration signal to compute the respective gain damage indices for the at least one sensor transducer as a function of the amplitude of the reference vibration signal multiplied by the amplitude of the comparison vibration signal, divided by a square of the amplitude of the comparison vibration signal; and
identifying damage in the structure when at least one of the respective gain damage indices is positive.

16. The SHM system of claim 14, wherein the DAQ circuit comprises a plurality of analog input/output channels corresponding to the plurality of transducers, and an analog to digital converter.

17. The SHM system of claim 14, wherein the processor is further configured to:
detect a phase shift in the comparison vibration signal due to a variation in temperature at which the comparison vibration signal is received relative to the temperature at which the reference vibration signal was previously collected; and
remove the phase shift from the comparison vibration signal before computing the respective gain damage indices.

18. The SHM system of claim 17, wherein the processor is further configured to detect a linearly progressing phase shift between the reference vibration signal and the comparison vibration signal.

19. The SHM system of claim 14, wherein the processor is further configured to identify, when at least one of the respective gain damage indices is negative, an amplitude difference in the comparison vibration signal relative to the reference vibration signal due to a variation in temperature at which the comparison vibration signal is received relative to a temperature at which the reference vibration signal was previously collected.

20. The SHM system of claim 14, wherein the processor is further configured to identifying a location of damage in the structure based on which of the respective gain damage indices is positive.

* * * * *